Jan. 6, 1942.    W. J. MILLER    2,268,717
METHOD AND APPARATUS FOR MANUFACTURING POTTERY WARE
Filed Sept. 21, 1937
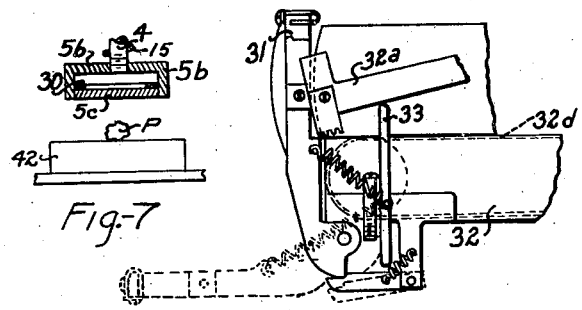
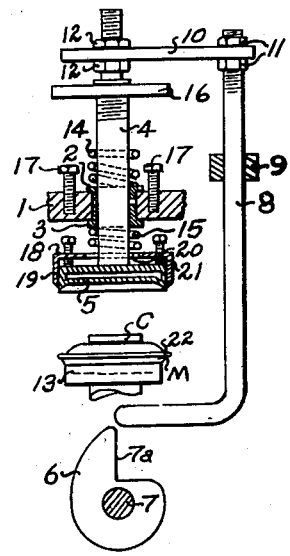
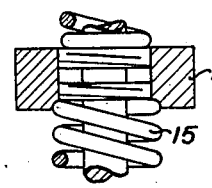
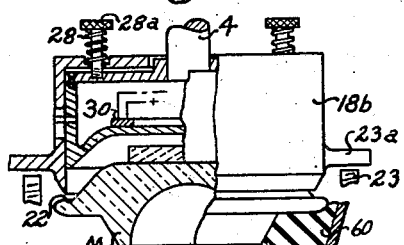
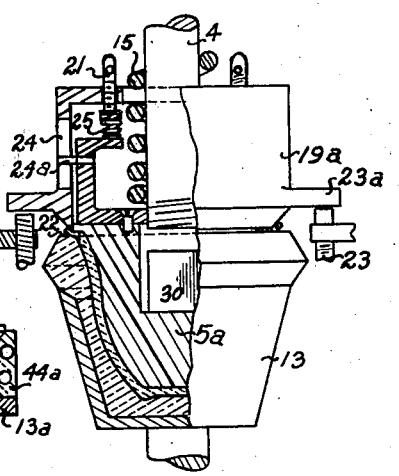
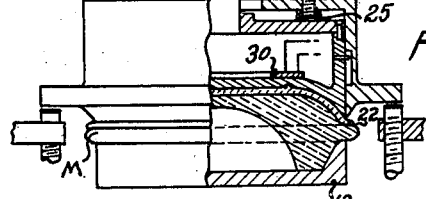
INVENTOR.
William J. Miller
BY George J. Croninger
ATTORNEY.

Patented Jan. 6, 1942

2,268,717

UNITED STATES PATENT OFFICE 2,268,717

METHOD AND APPARATUS FOR MANUFACTURING POTTERY WARE

William J. Miller, Swissvale, Pa.

Application September 21, 1937, Serial No. 164,899

18 Claims. (Cl. 25—22)

This invention relates to a method and apparatus for manufacturing pottery ware. This application is a continuation in part of my copending application Serial No. 5,795, now Patent #2,187,836.

This invention has to do with the manufacture of tableware such as dishes, plates, cups and saucers, etc. from plastic clay and is primarily concerned with methods and apparatus for forming and shaping the clay products from plastic clay mass to ware ready for green drying.

The most commonly used shaping process practiced in forming ware of this class is jiggering. Jiggering involves the batting, in the case of flat ware, of a flat slab of plastic material which is applied to a mold, the mold forming the face of the piece, the back of which is made by a profile tool. In the case of hollow ware (cups, bowls, etc.), the step of batting out is omitted in favor of "balling" which means to prepare and throw a ball or lump of clap forcefully into a spinning mold. The mold in this instance forms the exterior of the piece and the tool the interior. Finer grades of hollow ware are often made by forming the clay into a bat approximating the final ware shape before placing the bat in a plaster mold and finishing it with a profile tool.

The principal object of the present invention is to eliminate jiggering in the manufacture of ware of this class by compressively molding a finished, contoured and shaped product (ware) in readiness for green drying in a single high speed operation. Because the novel principles of the invention are applicable to the manufacture of hollow ware or flat ware jiggering bats, either on or off the mold on which the bat is finally jiggered and dried this invention is not restricted to use in connection with making molded ware in a single operation.

Other objects of this invention are to shorten the period required for making ware of the kind specified herein and to either eliminate the need for manual batting out and jiggering in the production cycle or to facilitate and expedite the work of batting out and jiggering; to remove the need for skill and manual craftsmanship in gauging the thickness, diameter, contour and volume of the clay in making either jiggering bats, or ware of the molded type, specified herein; to produce superior bats and/or molded type ware of increased density having greater resistance to breakage; to reduce equipment requirements and to conserve clay.

In more detail, as pointed out in my British Patent #471,589, it is proposed to form completed ware in one operation by impact, for instance by dropping an accurately centered and reliably guided forming member (die) directly into cooperation with the mold on which the ware is dried. The clay from which the ware is made is preferably cut off in predetermined volume from an intermittently fed clay billet and deposited in predetermined location on the mold, the shape of the charge and its position on the mold being such that under compression it will distribute over the mold to the desired diameter thickness and contour. The die has a molding surface complemental to and contoured to form the back or the interior, as the case may be, of the ware being produced and is arranged to rebound from the mold (clay) whilst means preferably in the form of a delayed action trimming ring encompassing the head of the forming member "strikes off" any spare which may have been produced. Thus in one operation a mold bonded, finished, contoured, trimmed and shaped piece of ware polished and ready for green drying is produced. Owing to the low tensile strength of the average pottery mold, means are provided to cushion the impact and regulate the closing speed and approach of the die and mold.

The apparatus just described may be utilized in the manufacture of mold bonded jiggering bats and with the substitution of a batting out head and a plaster block, the apparatus may be operated as a squash batter in making jiggering bats "off the mold." The trimming ring is an instrumentality which, according to the type of work being done may be utilized not only for the purpose specified but as a confining ring which together with the mold and forming member (die) will provide a substantially closed molding chamber.

Fig. 1 is a side elevation of the apparatus arranged to make mold bonded ware and/or jiggering bats and equipped with a flat ware die and Fig. 2 is a detail partly in section of the die in question shown in co-operation with a mold with the striking off ring in working position indenting the spare.

Fig. 3 is another view of the die and mold disclosing the arrangement and operation of the die and ring when the ring acts as a sealing member and not as a striking off device.

Fig. 4 is an elevation partly in section of a hollow ware die and associated ring.

Fig. 5 is a series of four diagrammatic views of the die and ring showing the relative position of the ring and die during a pottery making cycle.

Fig. 6 is a fragmentary elevation of an automatic charge feeder.

Fig. 7 is a diagrammatic view of the die arranged to make flatware hand thrown bats on a plaster-of-Paris block.

Fig. 8 illustrates a preforming mold, in which jiggering hollow ware bats may be made, and die.

The apparatus shown in Fig. 1, as described in my co-pending application Serial No. 5,795, is mounted on the frame of a fabricating machine, the part 1, corresponding to the lintel of the machine which in this case has a tapped bore in which adjustable upper and lower bushings 2 and 3 are threaded forming a guide for a rod 4 to which the die 5 (in this view a flat ware die which may be substituted for the hollow ware die 5a, Figs. 4 and 8, and the symmetrical batting out head 5b, Fig. 7), is demountably attached (see Fig. 4).

The rod 4 is elevated by a cam 6 which is keyed on and driven by the main cam shaft 7 of the machine and has a quick drop portion 7a for permitting the die to drop precipitately without restraint onto the clay charge C located on the mold M supported by chuck 13. The cam rod 8 mounted in a guide 9 has an arm 10 clamped between adjusting nuts 11 for adjustably determining the extent of rise of the rod 4 clamped to the arm by adjusting nuts 12. Quick adjustment of closing approach of the die with the mold may be made by the latter nuts.

A pair of coil springs 14 and 15 one above and one below the lintel 1 encompass the rod 4, the lower for impelling the die toward the mold when released by the cam 7 and the other for cushioning the impact and effecting rebound when adjustable collar 16 on rod 4 comes into engagement with and compresses the upper spring 15. The adjustment of bushings 2 and 3 determine the degree of compression of springs 14 and 15 and adjustably determine the speed with which the die is impelled and the instant of rebound respectively. The extent of approach of the molding surface of the die to the molding surface of the mold is limited by adjustable studs 17 thus controlling the thickness of the bat and the instant, extent and speed of rebound is aso controllable by the setting of the collar 16.

Referring to Fig. 1 which shows apparatus for impact molding flatware, the head of the die 5 is encompassed by a trimming device 18 having a depending knife edge trimmer 19 for cutting, indenting, and/or contouring the brim. The height of the knife edge portion of the trimming device is greater than the height of the die so that in working, the knife edge will descend below the die as the die reaches its down limit of travel and/or commences to rebound and sever or indent the spare extruded between the die and mold after the ware is pressed out. The ring has a large central aperture 20 to allow the spring 15 to bear directly against the die and is equipped with limit studs 21 for regulating the approach of the trimming ring to the mold.

In raised position, the knife edge 19 hangs below the lower brim of the die, the studs 21 being adjusted to permit this, however, the effect of the spring 15 is to project the die at a speed greater than it would normally fall by gravity thus causing it to "lead" the knife edge trimmer in the descent because the knife edge trimmer is not influenced by any force other than gravity. Around the studs 21 are cushioning springs similar to those at 25, Fig. 2, which resiliently arrest the downtravel of the ring once the die has stopped, the studs determining the depth to which the spare shall be struck off. Not in any event is the adjustment such that the ring will strike and mar the plaster mold.

The operation of the die is diagrammatically illustrated in Fig. 5. There it will be seen that the die and trimming ring occupy the relative positions just described with the die in dotted line position. When the cam 6 releases the die for descent into co-operation with the mold M, the spring 15 gives added impetus to the descent, the die leading the ring as in the second view from the top in Fig. 5. The third view from the top in Fig. 5 shows the relative position of the die and ring at the instant of engagement of the die with the clay charge and the bottom view the relative positions of the die and ring as the die and ring have completed the work and the ring has indented or severed the excess (spare). See also Fig. 2. As the die approaches the mold and contacts the clay, the clay is radially spread over the molding surface, Fig. 2, to predetermined thickness (section) bonded to the mold, contoured and shaped, the excess in one instance extruding at the brim of the die onto the brim zone 22 of the mold where it is severed or merely indented by the ring to insure "cracking off" in the dryer. The spare is easier to remove from the mold when dry and for this reason may not be pierced entirely through by the ring which might damage the mold if the knife edge came in direct contact therewith. Adjustable stops 23 (Fig. 2) which engage with ears 23a on the ring offer further means for limiting the downtravel of the ring. As an alternative, the mold may be elevated close to the die and the full power of the spring 15 utilized to press out the ware. In such event the stroke of the die would be considerably shorter. This operation could take place either as the mold was closing with the die or after the mold had reached its dwell.

As the trimming ring closes with the mold, the die having completed the pressing operation, rebounds under the influence of spring 14 which has been compressed by the collar 16. The molding surface of the die is operated at a temperature which prevents adhesion with the clay.

The cam 7 coincidently picks up the die and elevates it preparatory to impact molding another piece of clay. The cam is designed so that the upward movement of the die by the spring is continued after rebounding so that it will not have to pick up a dead or stationary load. The molding and trimming action is split-second in duration and the trimmer is immediately elevated with the die, and the position thereof relative to the die (top view Fig. 5) is restored by the action of springs 25. Molds may be supplied by hand, although to pace the increased speed of the machine it is preferred to mechanically supply the molds, say for instance by the belt and transfer means disclosed in my co-pending application.

In molding completed hollow ware such as bowls, cups, etc., Fig. 4, a male die 5a is substituted for the flat ware die of Fig. 1 on rod 4 and the knife edge trimmer 19 is replaced by one 19a having a greater depth in the trimmer flange. The operation of this assembly is substantially the same as hereinbefore described with relation to making flat ware. The pins 24a which work in slots 24b prevent relative rotation of the die and ring, limit the degree of relative movement and prevent disassociation of the same. It is preferred to positively limit the approach of the trimmer and mold by stops 23 which engage the ears 23a, this being also a feature of the flat ware assembly of Fig. 2.

The mold may, if desired, be rotated during the spreading of the clay on the mold whilst the die is in engagement with the clay. This polishes the surface of the clay and where fluid is required to lubricate the surface of the clay, it may be applied just previous to molding when the die is elevated or by facing the die with permeable material and extruding the fluid therethrough. In the event a permeable die face is used, the need for operating the die at a vaporizing temperature might be avoided. Separation of the die and clay could be obtained by forcing compressed air, steam or other fluid through the pores of the die face, this feature and the construction of dies for so doing having been described in other of my patents and applications. It is not, however, necessary to always rotate the mold in making completed ware and I do not wish to be limited by the foregoing statement to rotation as an essential step but more one that is optional depending on the character of the clay being worked and the class of ware being made.

I have shown in Fig. 3 a construction which I prefer to employ when the object is to conserve clay to the greatest possible extent. In this assembly the trimming ring has a depth greater than the depth of the die, the ring being identified by the numeral 18b. It is held in depressed position by the springs 28 mounted on adjustable studs 28a screwed into the top of the die. The ring together with a die and mold forms a chamber substantially closed except for a slight clearance between the leading edge of the ring and the mold for air escapement purposes. The approach of the ring to the surface of the mold is limited by studs 23 which engage the ears 23a on the ring.

Fig. 3 shows the die about to press out the charge, the ring 18b having about reached the limit of its travel. The ring 18b (with the die) in this arrangement engages and is propelled by the spring 15 upon release by the cam 6. When the die and mold are closed and with the trimming ring in operative position, any surplus can extrude through the slight clearance below the edge of the ring albeit it is preferred that this condition be avoided through proper and accurate charge bulk determination. As in the other instance, the die rebounds carrying with it, however, the trimming ring and is elevated by cam 6 to original position.

Potters clay is inherently sticky and moist and to prevent adhesion of the die surface and ring therewith which would tend to rip the bat from the mold or generally slow down production if the dies required periodic cleaning, the molding surfaces of these dies are preferably heated, as taught in my Patent No. 2,079,082, preferably by electric resistance elements 30 which are located in the die heads and are automatically controlled to maintain an optimum die and ring temperature. Release from the clay is by a repellent vapour generated from the moisure in the clay. The interval of association in the present arrangement is too brief to case harden or pit the surface of the clay and produces a polished surface. The die can be rotated relative to the mold whilst pressing if desired or the mold may be rotated, primarily for the purpose of increasing the polish.

Clay of the type used in the making of ware of this class while incompressible can nevertheless be densified under pressure by removing a certain portion of the fluid through pressing it into the pores of the mold and/or evaporating it through contact with a heated forming member. Denser ware is less apt to warp and crack and has a lower shrinkage coefficient and in the finished product has superior strength.

Accuracy of charge measurement, volume and spotting is important as it facilitates uniform spreading and conserves clay. To obtain extremely accurate bulk charges of clay containing within close limits the volume required for the piece without appreciable excess, the automatic adjustable feeder shown in Fig. 6 may be utilized with the impact molding apparatus previously described. The arrangement could be such that charges of clay would be fed to the molds at a station in advance of the impact molding apparatus, the molds being automatically conveyed therefrom and centered over the chuck 13, Fig. 3, in much the same fashion as disclosed in my Patent No. 2,079,082.

As disclosed herein, the feeder comprises a spotting ring 31 releasably pivoted to the feeder frame 32 at the lead end of the slug belt 32d. The charge is segregated while held in the ring which is released by the slicer arm 32a completing its stroke and depressing the pin 33, thus allowing the rim to pivot and accurately spot the charge on the previously centered mold. Because of the variation in bulk content of various types of ware, the amount of clay in a charge will vary. It is understood that the feeder is optional and the molds may be hand charged if desired. In the case of making hollow ware, the shape of the charge is more that of a cylindrical stub rather than a comparatively thin disc.

Where the object is to make bats, that is slabs of clay containing considerable excess material, for subsequent shaping into the completed piece by jiggering, the apparatus hereinbefore described may be utilized, it being a matter of the volume of clay deposited in or on the molds which would spell the difference between an impact molded piece of ware and a bat of course, taking into consideration that the pressures required to form a bat might be reduced over those required to form ware by impact and the molding surface of the die need not necessarily have the high polish I prefer in ware making dies.

It is understood that both hollow ware and flat ware bats may be made by the method and apparatus herein described and that the bats mentioned in the preceding paragraph are formed on and bonded to the plaster mold on which they are jiggered to final form, finish and polish.

In making better grades of hollow ware, particularly china and porcelain cups, the bat is often formed "off the mold" in the shape of the article and then removed and thrown into the plaster mold. Figure 8 shows a former for making bats of this character "off the mold" which is located on a chuck 13a provided with an ejector 44 and a mold surface made non-adhesive by, for instance, providing a porous body 44a with a plurality of pressure ducts 45a therebehind through which compressed air, steam, liquid or other fluid may be blown to separate the clay from the wall of the molding chamber. The die used with this arrangement is the same as that shown in Fig. 4, the drop-die principle and operating mechanism of Fig. 1 being employed in operating it.

Inasmuch as the making of a flat "pancake" bat is identified with the making of flat ware and shallow hollow ware and is not ordinarily followed in making cups or deep hollow ware, a flat ware spreader shown in Fig. 7 is provided for making bats of this character "off the mold." The apparatus consists of a batting out head 10 5b with a demountable spreading head 5c flat on the clay engaging side. The die is hollow for the reception of a heating element or it may be utilized as a fluid cavity. In fact, any of the dies thus far described may be heated by steam rather than electricity by providing a steam cavity in the head. Returning to Fig. 7, a block 42 is arranged in registration with the head and has a flat upper surface on which the batter places gobs of clay P to be flattened into disc-like mold charges. The cutter ring may be used if desired, but the operation of the machine is the same.

In my application Serial No. 573,017 now Patent 2,109,028 the closing speed, dwell and separating speed of the die and mold in batting out clay on the mold are controlled by cam and toggle arrangement and the intervals are individually and collectively of longer duration than that required for corresponding action herein.

It is an object of this invention to shape and form clay (ware) at high speeds, that is to say, the fundamental fabricating steps are performed in a space of time of appreciably shorter duration than heretofore, thus as an additional feature permitting a decrease in overall time required to complete a machine or mechanical cycle and as a consequence promoting increased production speeds and machine capacity.

The present method and apparatus contemplates the making of a bat or a piece of ware in less time than required to bat out by hand with a conventional plaster mallet, and to distinguish the present process and apparatus from other and slower processes and apparatus, I have adopted the terms "quick action" or "quick acting" in definition thereof.

In explanation of these terms, it is contemplated herein that the operations in question shall occupy the shortest practical space of time mechanically possible and yet produce acceptable ware. In accordance with this desiderata, the die is moved toward the work at high veloctiy preferably by the spring means shown or even by a cam or other means. In this way, maximum spreading power is instantly available at the time the die engages the clay and the interval required to spread and/or complete the piece and hence the interval the die is in contact with the clay is reduced to a minimum consistent with the crushing strain which the mold will stand and the viscosity of the clay. It has heretofore been the practice to gradually engage the die and clay and to approach a peak pressure by degrees holding the pressure for a brief interval and then slowly separating the die and mold. This method is cited only by way of comparison with no intended reflection on the merits thereof.

Once the non-adhesive die has completed its work, separation with the clay and mold instantly ensues, there being no mechanical restraint on the die which would be apt to cause any abnormal dwell. It is advantageous in point of increased production speeds to accelerate spreading and separation and shorten contact, but where a hot press is involved in the fabrication of ware of this class, the less time the heated forming instrumentality is in engagement with the clay, the less opportunity there is for drying out and cracking the ware surface.

Nor is the invention to be limited to a "quick acting" die or "quick action" method involving only the working of a die since the fundamental result could be obtained by holding the die stationary and engaging the mold therewith at a high velocity under applied force if desired rather than a gravity drop. Obviously, both the die and mold could be moved relative to one another to achieve the result specified. In the instance of causing the die to rebound from the mold, this is only one of many ways in which the effect of quick separation could be obtained. For instance, the cam contour could be designed to immediately lift the die (separate the mold and die or separate the mold from the die) once the work was completed.

It is desired that the mold be yieldably supported in certain instances and while I prefer to utilize the chuck mounting specified in my Patent 2,079,082, I have also provided a rubber support 60 shown in section in Fig. 3. This support absorbs the shock without appreciable yield and in one or more forms is adapted to be utilized with any one or all of the molds or block supporting means herein disclosed.

What I claim is:

1. In combination with a support on which charges of clay are spread, a forming member for co-operation with said support means for elevating and dropping the forming member and mechanism for effecting quick action in the co-operation and separation of the forming member and clay.

2. In combination with a mold on which clay is spread, a non-adhesive die for co-operation therewith means, for elevating and dropping said die and mechanism for effecting quick action of the die in co-operating with the mold and separating from the clay.

3. In apparatus of the class specified, a mold, a support for a die, a die mounted thereon in registration with said mold, means for alternately elevating and dropping said die into contact with a charge of clay placed on the mold, a rebound spring for reversing the direction of movement of the die incident to the completion of the work, means for striking off the spare and means for delaying the action of said last named means until the die has spread out the clay.

4. In apparatus of the class specified, a mold, a reciprocable support for a die, a die mounted on said support, means for elevating and dropping said die, resilient means for increasing the velocity of the die in dropping, means opposing the descent of the die for causing the same to rebound from the work incident to the completion of the spreading operation of a clay charge, placed on the mold, means for striking off the spare comprising a ring associated with the die, and resilient means for delaying the action thereof until the die has spread the clay.

5. In apparatus of the class described, a plaster mold and a shock absorbent support therefor, a non-adhesive forming member, means for lifting and dropping the forming member and means opposing the spreading force thereof for reversing the direction of movement of the forming member and causing said forming member to rebound from the work at the completion of the spreading operation.

6. In apparatus of the class specified, a mold support, a superimposed die, cam means for elevating and dropping said die, resilient means for increasing the descending velocity of the die, resilient means for moving the die in a reverse direction incident to completion of the work and means for varying the limit of approach of the die and mold support to thereby predetermine the thickness of the completed work.

7. In apparatus of the class specified, a die having provisions for alternately raising and dropping the same together with means for increasing the descending velocity, a mold support for plaster molds on which clay is spread by the die, means for causing the die to rebound from the mold incident to the completion of the work and means for striking off the spare.

8. In apparatus of the class specified, a mold chuck having a resilient mold seat, a die, a rod on which said die is mounted, guide means for said rod, a pair of coil springs encompassing said rod one above and one below said guide, a cam for elevating and dropping said die, a plate associated with said rod for compressing the upper coil spring to cause the die to rebound and means for rendering the die non-adhesive to the clay.

9. In apparatus of the class specified, a mold chuck having a mold seat of rubber of equivalent material, a mold, a non-adhesive die arranged in registration therewith, mechanism for alternately elevating and dropping the die into forceful engagement with the clay on said mold, resilient means for causing the die to rebound from the mold and means associated with said elevating mechanism for compressing said resilient means incident to co-operation of the die and the work.

10. A method of forming potteryware from plastic clay on absorbent molds which comprises, spreading the clay on and bonding the clay to the mold by the force of impact of a rapidly moving forming member, instantaneously retracting the forming member from engagement with the clay incident to completion of the work, there being no appreciable dwell of the forming member in contact with the work.

11. A method of forming potteryware from plastic clay on absorbent molds which comprises, spreading the clay on and bonding the clay to the mold by the force of impact of a rapidly moving forming member, cushioning the impact both above and below the mold and developing potential energy in one of the cushioning agents to effect the instantaneous retraction of the forming member from engagement with the clay incident to completion of the work, there being no appreciable dwell of the forming member in contact with the work.

12. In apparatus for manufacturing potteryware, the combination with a plaster mold adapted to receive charges of clay and a support therefor of a forming member movable axially of the mold and means for imparting high velocity to the forming member in the engagement and disengagement thereof with the clay together with means for reducing the force of impact to a value below the crushing limit of the mold.

13. In apparatus for manufacturing potteryware, the combination of a mold adapted to receive charges of clay, an axially movable forming member, means for imparting high downward velocity to the forming member so as to form the charge of clay by impact together with means for distributing the force of impact uniformly throughout the mold in order to prevent the crushing thereof which includes a support for said mold having a resilient liner contacting the mold on the side and base portion thereof.

14. The method of manufacturing pottery articles which comprises charging a plaster mold with clay and shaping the same thereon by the movement of a forming member axially of the mold and imparting high axial velocity to the member incident to engagement and disengagement with the clay to thereby instantaneously raise the forming pressure to its final value and immediately release the same.

15. In a batting out apparatus, the combination with a block upon which charges of clay are spread to the dimensions of a bat of a batting out head movable axially of the block, means for elevating the said batting out head, means for imparting a high axial velocity to said batting out head and means for effecting instantaneous disengagement of the batting out head and clay.

16. The method of fabricating pottery ware which comprises forming a charge of clay of smaller diameter than the molding surface of an absorbent ware mold and locating the aforesaid charge in substantially centered position on the aforesaid mold and by the movement of a forming member axially of the mold spreading the charge of clay over the exposed portion of the molding surface, there being high axial velocity imparted to the member incident to engagement and disengagement with the work, there being no appreciable dwell between said member and the work and striking off the spare incident to disengagement of the forming member from the work.

17. The method of fabricating dinnerware which comprises forming a charge of plastic clay of smaller diameter than the molding surface of the mold to which it is to be applied depositing the charge of material on the mold in substantially centered position and thereafter spreading the clay over the exposed portion of the molding surface by the relative axial movement of the mold and a forming member and imparting high axial velocity to the mold and forming member, either one or both of them, incident to engagement of the forming member and the work to thereby substantially eliminate dwell.

18. In apparatus for manufacturing pottery ware the combination which comprises a mold made of absorbent material, means capable of absorbing shocks for supporting said mold, means for charging the surface of the mold with clay bodies of a diameter smaller than the diameter or extent of the molding surface and means for forming the aforesaid charge of clay by spreading the same over the surface of the mold comprising an axially movable forming member consisting of a non-adhesive die, means for raising and lowering said die relative to the mold and means for effecting quick action in the engagement of the forming member with the work and retraction of the forming member therefrom.

WILLIAM J. MILLER.